June 9, 1959  V. H. BAGLEY  2,889,860
DEBARKING ADAPTER FOR CHAIN SAW
Filed Sept. 17, 1956  2 Sheets-Sheet 1

Vernon H. Bagley
INVENTOR.

BY
Attorneys

June 9, 1959 V. H. BAGLEY 2,889,860
DEBARKING ADAPTER FOR CHAIN SAW
Filed Sept. 17, 1956 2 Sheets-Sheet 2
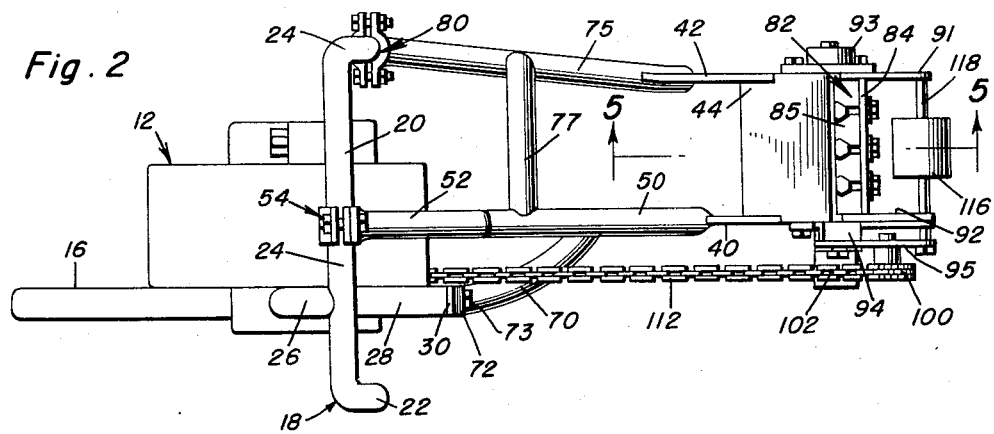
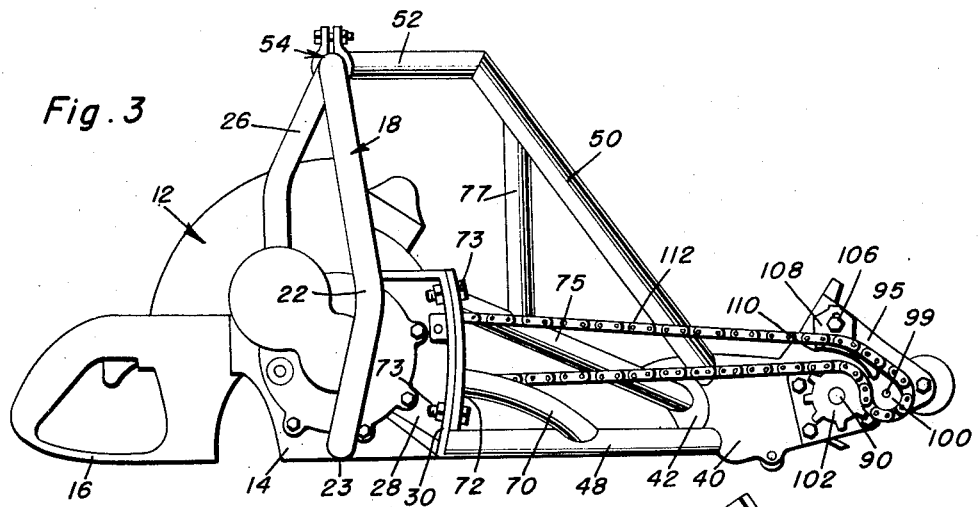
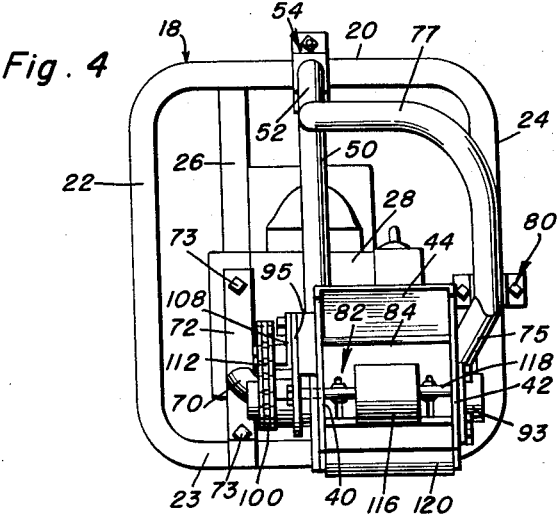
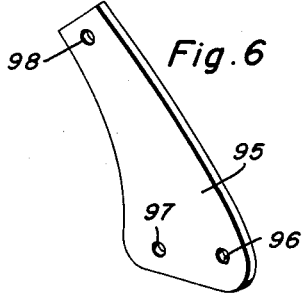
Vernon H. Bagley
INVENTOR.

United States Patent Office
2,889,860
Patented June 9, 1959

2,889,860

DEBARKING ADAPTER FOR CHAIN SAW

Vernon H. Bagley, Astoria, Oreg.

Application September 17, 1956, Serial No. 610,166

6 Claims. (Cl. 144—208)

This invention relates to a power tool, and more particularly to a debarking device for use in pole yards and in piling operations.

An object of the present invention is to provide an attachment for a hand-operated chain saw which converts the chain saw to a debarking device, the attachment being bolted or otherwise connected to the saw body and protruding forwardly thereof, the saw body supporting an engine that is drivingly connected through a chain to a cutter carried by the frame.

A further object of the present invention is to provide an attachment for a chain saw which uses power components of the chain saw in a debarking operation, whereby the chain saw is made more versatile, the attachment being characterized by its ease of mounting on the chain-saw body, being attachable and removable by means of an ordinary wrench and yet functioning in a manner wholly satisfactory to a professional working in this field.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 2 is a top view of the attachment of Figure 1 showing it in place on the chain-saw body;

Figure 3 is a side view of the structure in Figure 1;

Figure 4 is an end view of the structure in Figure 1;

Figure 6 is a perspective view of a mounting plate that constitutes a part of the attachment.

Figure 1:
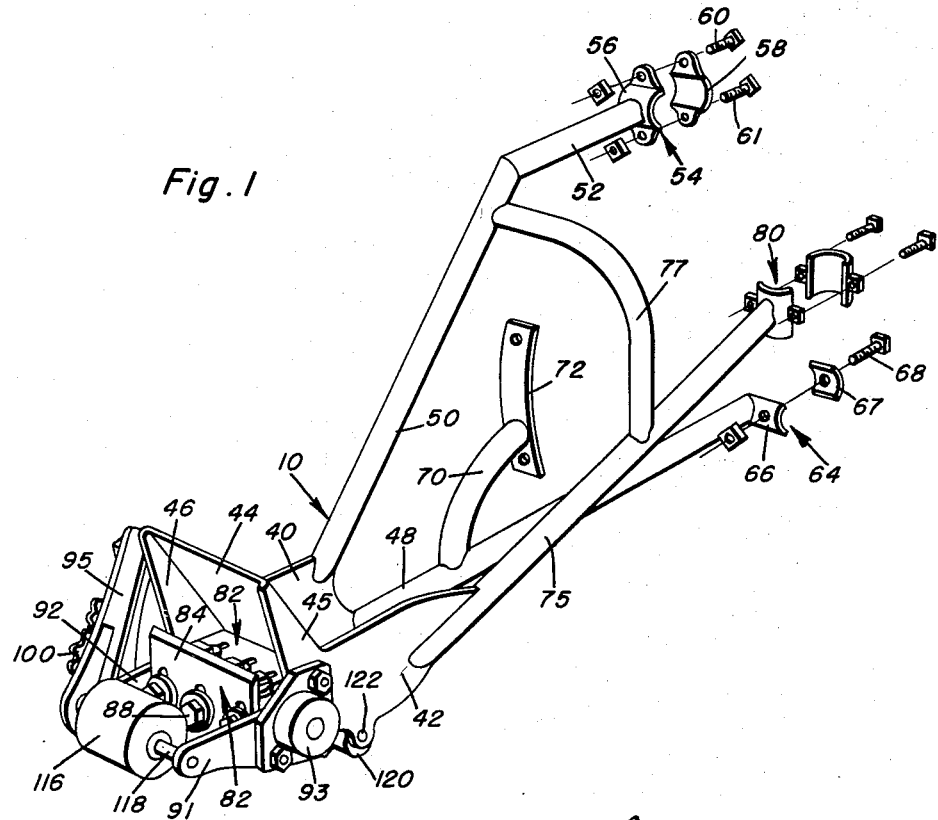
Figure 1 is a perspective view of an attachment which is constructed in accordance with the invention and which is ready to be mounted on the body of a commercially available chain saw in order to convert the chain saw to a debarker.
Figure 5:
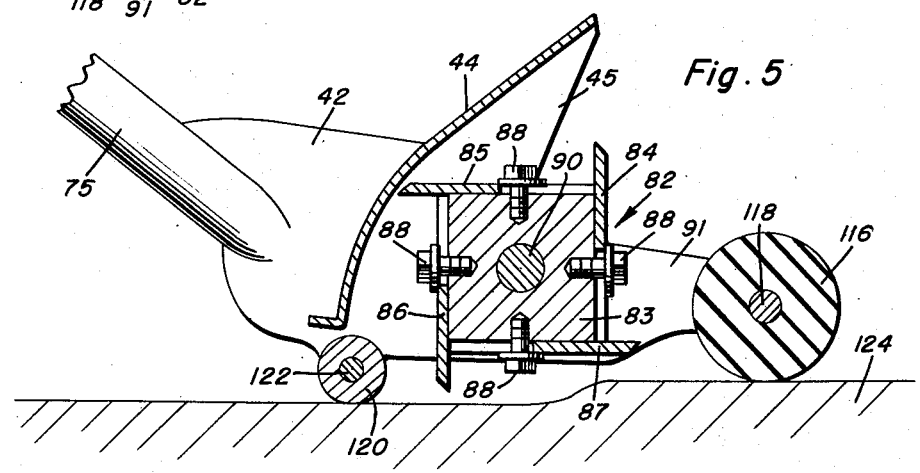
Figure 5 is an enlarged, fragmentary sectional view taken on the line 5—5 of Figure 2.

In the accompanying drawings there is an attachment 10 which is adapted to be secured to the body of a chain saw 12. This chain saw is only partially shown in Figure 2, since its cutter chain and part of the frame have been removed in order to adapt it for use with the attachment 10. The part of the saw 12 that is illustrated is from a model 17 "Thomelite" brand power saw. The illustrated part of the power saw includes a body 14 that has an engine in front of a rear handle 16. A tubular handrail 18 having an upper transverse rail 20, a lower transverse rail 23, and two side rails 22 and 24 is attached to the body 14 and functions as a guard and a handle for the power saw while the saw is in normal use. A support 26 is attached to the transverse rail 20 and to the body. In addition, the body has a forwardly extending casting 28 with a curved flange 30 at the forward edge thereof, this flange providing a seat against which the forwardly projecting frame of the saw is adapted to abut.

The attachment 10 comprises a pair of parallel side plates 40 and 42 connected intermediate their ends by a center plate 44 which serves as a chip guard and which slopes upwardly and forwardly and has a pair of flanges 45 and 46 that are also integral with the side plates 42 and 40. The plate 40 has two tubular arms 48 and 50, each secured to its rear edge, the arm 50 sloping upwardly and rearwardly and merging into a horizontal extending part 52 which terminates in a coupling 54. This coupling consists of a pair of saddle bearings 56 and 58, each provided with ears through which bolts 60 and 61 are passed, and is separably attached to the upper transverse rail 20. The arm 48 extends horizontally and terminates in a coupling 64 for attaching the arm 48 to the lower transverse rail 23 (the resulting joint not being illustrated). The coupling 64 consists of a concave bracket 66 which protrudes laterally from the arm 48, a concave cap 67, and a bolt 68 which passes through alined apertures provided in the cap 67, the rail 23 and the bracket 66, so as to hold the frame 10 rigid with the saw body 12. A smoothly curved tubular arm 70 is welded or otherwise rigidly secured at one end to the arm 48 between the ends thereof and has a curved plate 72 welded or otherwise rigidly fixed to its outer end, the plate 72 being formed with a plurality of openings. Bolts 73 are passed through these openings and through corresponding openings in the mounting flange 30, further assuring that the frame will be rigidly connected to the body of the saw. The plate 42 has a tubular arm 75 rigidly fixed thereto and extending upwardly and rearwardly at an inclination which is not as steep as the inclination of the arm 50. A curved brace 77 is welded or otherwise fixed to the arms 75 and 50 and functions as a handle to aid in the use of the debarker attachment. A coupling 80 at the upper extremity of the arm 75 is similar in construction and function to the coupling 54, except that it joins the arm 75 and the side 24 of the handrail 18.

The forward end of the frame constitutes the major structural part of the attachment and has a cutter 82 mounted for rotation therein. This cutter consists of a block 83 having a plurality of sides on each of which there is a cutter blade, for example, blades 84, 85, 86 and 87. Each blade has a plurality of slots through which mounting bolts 88 pass, the latter entering tapped openings in the block 83. In this way, the blades 84, 85, 86 and 87 may be adjusted.

A spindle 90, which extends axially through the block 83 and is fixed thereto, has end portions that pass through aligned openings in the forward extensions 91 and 92 of the plates 42 and 40, and into bearings 93 and 94 on opposite sides of the plates 40 and 42, the spindle 90 thus being mounted for free rotation. The bearings (Figure 1) are preferably mounted on bolted plates for ease in mounting and demounting the spindle and cutter and for slight adjustment thereof.

A mounting plate 95 is bolted onto the outer side of the bearing 94 and has three openings 96, 97 and 98, respectively, therein. The opening 96 accommodates a spindle 99 on which an idler sprocket 100 is mounted for rotation. The opening 97 has the spindle 90 passed therethrough, and a driven sprocket 102 is secured to that part of the spindle passing through the opening 97. The opening 98 accommodates a bolt 106, the latter adjustably mounting a chain support 108 inasmuch as there is a slot in the support 108 through which the bolt 106 passes. The support has a laterally projecting flange 110 over which an upper flight of a chain 112 travels. This chain extends around the drive sprocket of the engine of the chain saw and around an idler sprocket 100, so that its lower flight will pass over the driven sprocket 102 and engage the teeth thereof. The flange 110 not only supports the upper flight of the endless chain, but functions as a chain tightener and also separates the flights of the chain.

The depth of cut taken by the rotary cutter 84 is regulated by the adjustment of the blades of the cutter and is limited by log-contacting rollers 116 and 120 mounted fore and aft of the cutter 82. The forward roller 116 is mounted on an axle 118, the latter being carried by the projecting parts 91 and 92 of plates 40 and 42. The rear roller 120 is mounted on an axle 122 carried by the plates 40 and 42.

In operation, after preparing the chain saw for use as a debarker, the tool is placed on a workpiece, such as log 124 the rollers 116 and 120 contacting the surface thereof. The engine of the chain saw is set into operation, thereby driving the chain 112. This causes the cutter to be rotated at high speed and with ample power to perform the debarking operation on the workpiece.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment to convert a chain saw to a portable debarker wherein the saw has a body and an engine-driven sprocket carried by said body, said attachment comprising a frame, means attaching said frame to said body, a rotary cutter carried by said frame, a cutter sprocket connected to said cutter, a chain drivingly connecting said sprockets, a chain support against which the chain rests, and means adjustably securing said chain support to said frame.

2. An attachment to convert a chain saw to a portable debarker wherein the saw has a body and an engine-driven sprocket carried by said body, said attachment comprising a frame, means attaching said frame to said body, a rotary cutter carried by said frame, a cutter sprocket connected to said cutter, a chain drivingly connecting said sprockets, a chain support against which the chain rests, means adjustably securing said chain support to said frame, and work-contacting means carried by said frame in order to support the frame on a workpiece.

3. In a chain-saw body, an attachment comprising a frame, means attaching said frame to said body in position to have said frame protrude in advance of said body, a cutter having a spindle, said frame including a pair of plates between which said spindle and cutter are mounted for rotation, and means for rotating said spindle.

4. In a chain-saw body provided with an engine and a transverse handrail, an attachment comprising a frame having a pair of side plates, rearwardly extending arms secured to said plates, couplings detachably securing said arms to said rail, a spindle rotatively carried by said plates, a cutter connected with said spindle, and means drivingly connecting said engine to said spindle in order to rotate said cutter.

5. In a chain-saw body provided with an engine and a transverse handrail, an attachment comprising a frame having a pair of side plates, rearwardly extending arms secured to said plates, couplings detachably securing two of said arms to said handrail, a spindle rotatively carried by said plates, a cutter connected with said spindle, means drivingly connecting said engine to said spindle in order to rotate said cutter, means connecting said two arms, and mounting means secured to another of said arms and said saw body to provide support for said frame.

6. In a chain-saw body provided with an engine and a transverse handrail, an attachment comprising a frame having a pair of side plates, rearwardly extending arms secured to said plates, couplings detachably securing two of said arms to said handrail, a spindle rotatively carried by said plates, a cutter connected with said spindle, means drivingly connecting said engine to said spindle in order to rotate said cutter, means connecting said two arms, mounting means secured to another of said arms and said saw body to provide support for said frame, and a forwardly directed baffle secured to and located between said plates.

References Cited in the file of this patent

UNITED STATES PATENTS

| | | |
|---|---|---|
| 1,642,145 | Ferguson | Sept. 13, 1927 |
| 2,411,257 | Friedman et al. | Nov. 19, 1946 |
| 2,708,468 | Lantz | May 17, 1955 |

FOREIGN PATENTS

| | | |
|---|---|---|
| 526,647 | Germany | June 8, 1931 |
| 1,081,755 | France | June 9, 1954 |
| 183,953 | Austria | Dec. 10, 1955 |
| 525,208 | Canada | May 22, 1956 |
| 87,829 | Norway | Aug. 6, 1956 |